Patented Dec. 31, 1946

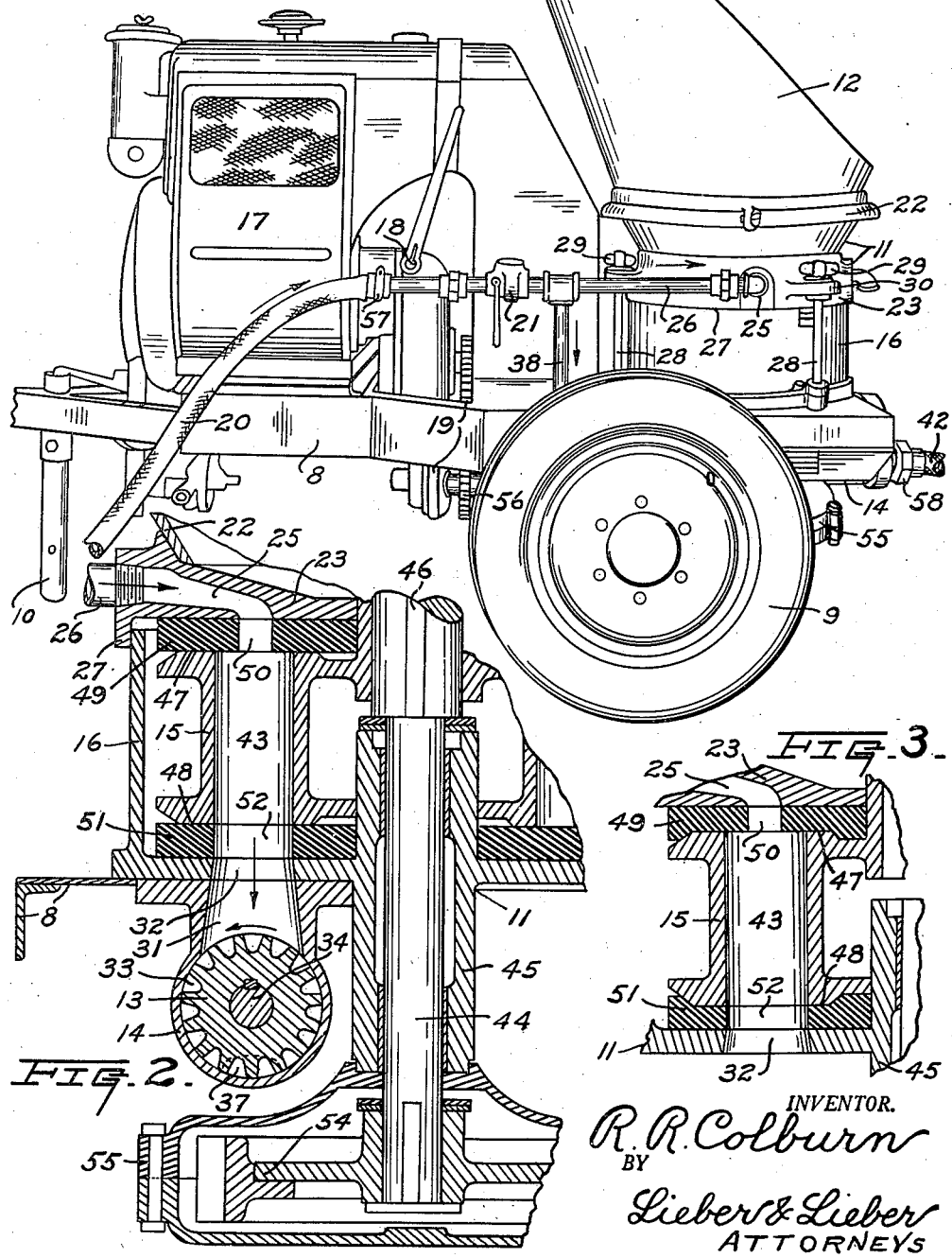

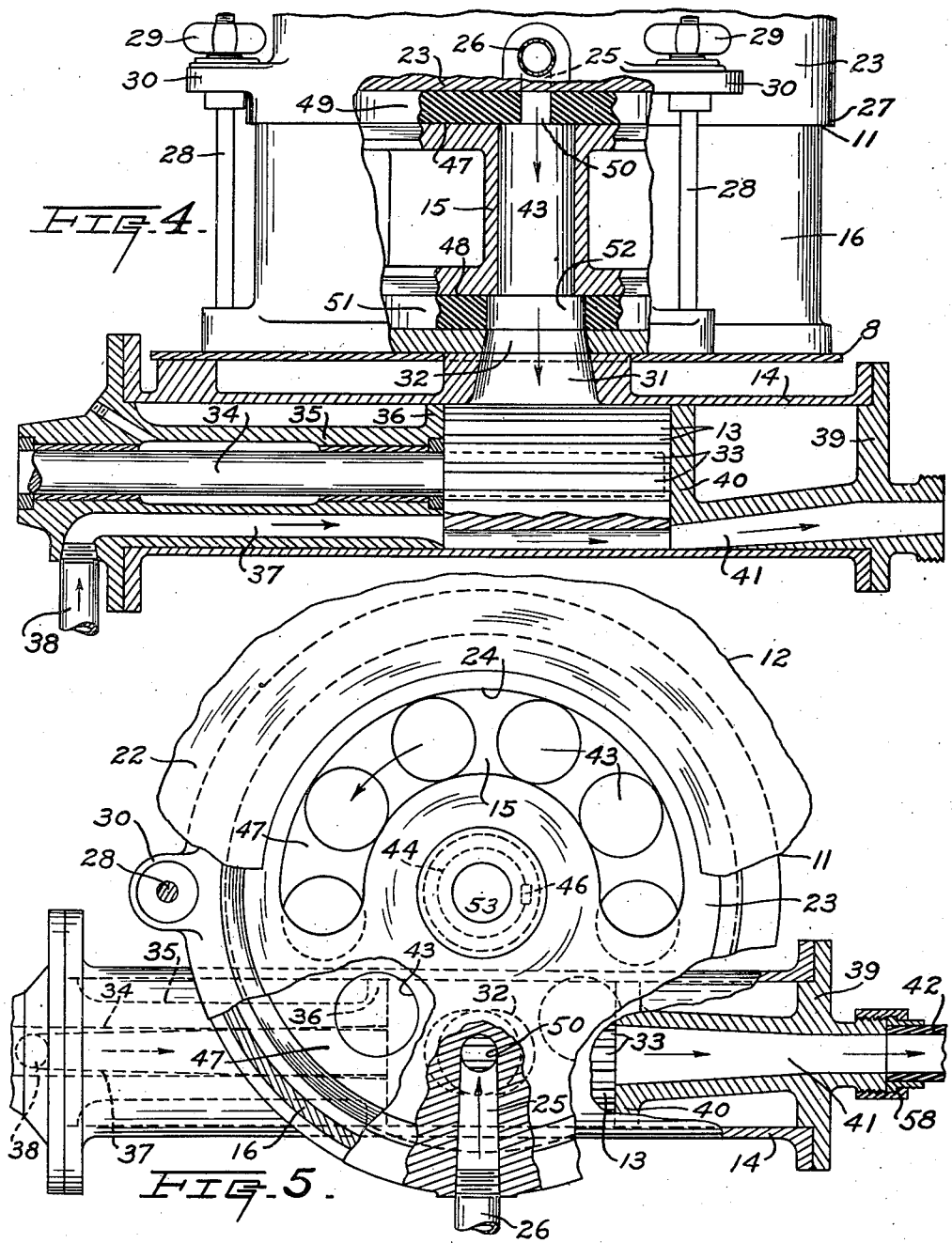
Dec. 31, 1946. R. R. COLBURN 2,413,293
AGGREGATE MEASURER AND FEEDER
Filed March 30, 1945 2 Sheets-Sheet 2
INVENTOR.
R. R. Colburn
BY
Lieber & Lieber
ATTORNEYS.

2,413,293

UNITED STATES PATENT OFFICE 2,413,293

AGGREGATE MEASURER AND FEEDER

Richard R. Colburn, Waterloo, Iowa

Application March 30, 1945, Serial No. 585,643

16 Claims. (Cl. 302—49)

My invention relates generally to improvements in the art of mixing and transporting diverse materials pneumatically, and relates more specifically to various improvements in the construction and operation of mechanism for continuously mixing relatively finely divided dry materials and for automatically transporting the mixture to places of utilization with the aid of compressed air or the like.

The primary object of this invention is to provide an improved aggregate mixer and feeder which is simple in construction and highly efficient in operation.

As shown and described in my prior Patent No. 2,299,565, granted October 20, 1942, it has heretofore been proposed to provide mechanism for continuously mixing and feeding finely divided materials, by causing a series of constantly revolving measuring pockets to successively communicate with a material supply hopper so as to initially receive batches of the material, by thereafter sealing the pockets and ejecting the measured batches in succession from the sealed pockets into the zone of action of a direction changing screw conveyor with the aid of compressed air, and by finally permitting the air stream to pneumatically transport the mixture from the conveyor screw past a converging orifice and through a conduit and nozzle to the place of utilization. While this system of measuring and feeding such material is quite satisfactory for some purposes, it has been found relatively objectionable for the specific purpose of thoroughly mixing and continuously delivering a constant and uniform stream of concrete aggregate comprising an intimate mixture of pulverulent cement, fine sand, and/or other finely divided material to a cement gun being used for applying thin layers of concrete to walls or other surfaces. Such fine and dry cementitious mixture may be readily transported pneumatically through relatively straight and unobstructed passages or conduits of uniform cross-section; but is subject to piping and slugging action when the conducting passages are irregular, internally obstructed, and of improper dimensions.

Although no great difficulty has been encountered in discharging the successive measured batches of aggregate material from the annular series of revolving pockets with the aid of compressed air injected downwardly into these pockets, the measuring pockets must be tightly sealed from the ambient atmosphere at all times, in order to cause the admitted air to most effectively and rapidly deliver the premeasured charges. It has also been found that the slug producing tendency of the conveyor screw to which the successive batches of material are delivered, may be substantially eliminated by properly constructing the screw; but when the helical screw of such a conveyor is stopped and re-started, the subsequent admission of compressed air causes the mass of material which has been confined within the screw during stoppage, to be ejected toward the final delivery conduit as a slug which invariably clogs the passage, shears the conveyor driving pin, and prevents material from reaching the spray gun.

I have discovered that the measuring pockets may be effectively sealed by constructing the pocket forming rotor and sealing members in an improved manner, and that absolutely uniform and constant delivery of the pre-measured batches of fluent material can be insured by releasing these batches into a series of relatively small straight ducts or passages revolving about an axis and which are successively filled from the measuring pockets and are thereafter brought into alinement with the final discharge conduit whereupon they are subjected longitudinally to pneumatic pressure in the direction of the discharge flow in addition to the compressed air used for removing the batches from the measuring pockets. These small feed passages combined wtih proper proportioning of the air supply ducts, positively prevent objectionable slug formation and clogging during starting as well as during normal operation, and insure perfectly uniform feeding and proper transportation at all times of materials which are most difficult to handle.

It is therefore a more specific object of the present invention to provide various improvements in the construction and operation of pneumatic feeders of the type forming the subject of my said prior patent, whereby the utility of such devices is enhanced especially for the purpose of delivering uniform and proper feed to a cement gun or the like.

Another specific object of my present invention is to provide an improved fine material measuring, mixing and pneumatic feeding device wherein compressed air is most effectively utilized to intimately mix and to continuously transport the material to the zone of utilization, with minimum attention and without permitting undesirable escape of air or material.

A further specific object of the invention is to provide an improved combined measurer, mixer and feeder for finely divided concrete aggregate or the like, wherein uniform delivery of final mixture is assured at all times, and in which objectionable slug formation and clogging are positively eliminated.

Still another specific object of this invention is to provide an improved pneumatic material feeding system which is simple, compact and durable in construction, and extremely reliable and automatic in operation, and which is especially adapted to handle pulverulent and granular substances with the aid of high pressure gas such as compressed air.

An additional specific object of my invention is to provide an improved cement gun spraying unit which may be manufactured and operated at moderate cost, which may be conveniently transported from place to place, and which is also exceedingly flexible in its adaptations.

These and other specific objects and advantages of the invention should be more clearly apparent from the following detailed description.

A clear conception of the improvements constituting my present invention, and of the mode of constructing and of operating concrete spray gun systems built in accordance therewith, may be had by referring to the drawings accompanying and forming a part of this specification in which like reference characters designate the same or similar parts in the various views.

Fig. 1 is a perspective view of one of the improved measuring, mixing and pneumatic feeding units mounted for transportation upon wheels and having the operating engine associated therewith;

Fig. 2 is an enlarged fragmentary vertical section taken radially through the material measuring rotor and pocket sealing members and transversely through the improved feed rotor for insuring uniform delivery of material from the successive measuring pockets;

Fig. 3 is a similarly enlarged fragmentary vertical section through one of the material measuring pockets, showing the pocket sealing action when the sealing members have become worn;

Fig. 4 is a part sectional side elevation of the improved measuring and pneumatic feeding assemblage, the section having been taken vertically and centrally through one of the revolving measuring pockets and through the final delivery mechanism for insuring uniform delivery of the material; and Fig. 5 is a fragmentary top view of the improved measuring and pneumatic feeding assembly, horizontal sections having been taken through various parts of the mechanism in order to disclose details of construction of various normally concealed parts.

While the invention has been shown and described as being especially useful in connection with concrete spray guns, it is not my desire or intention to unnecessarily restrict the utility by virtue of this disclosure; and as to details of construction of the material supply hopper and of the final spray delivery nozzle, these may be approximately the same as shown and described in my former Patent No. 2,299,565, granted October 20, 1942.

Referring to the drawings, the improved measuring and feeding unit shown therein, comprises in general a portable truck having a sturdy chassis or frame 8 mounted on wheels 9 and provided with a prop 10 at the front end thereof; a material measuring and feeding assemblage 11 mounted upon the rear end of the frame 8 between the wheels 9 and having an upper material supply hopper 12, a lower increment feed rotor 13 rotatable about a horizontal axis within an elongated discharge conduit 14, and an intermediate material measuring and air lock rotor 15 revolvable about a vertical axis within a housing 16 between the hopper 12 and conduit 14; an internal combustion engine 17 or other type of power motor, mounted upon the frame 8 between the wheels 9 and prop 10, and being drivingly connectable with the rotors 13, 15 by means of a clutch mechanism 18 and suitable transmission gearing 19; and a compressed air supply line 20 communicating with any suitable source of air pressure supply and being adapted to deliver compressed air in regulated quantities to the assemblage 11 past a manually manipulable valve 21.

The transportation vehicle or truck upon which the improved measuring and feeding assemblage 11 and the propelling engine 17 are mounted, may be of any suitable and durable construction, and the tubular feed rotor casing 14 and measuring rotor housing 16 should be firmly secured to the truck frame 8 in any desired manner. The material supply hopper 12 of the assemblage 11 is provided with a frustro-conical lower supporting ring 22 which is rigidly secured to the lower hopper base 23, and this lower base 23 has an elongated arcuate feed slot or opening 24 therein and is also provided with a compressed air passage 25 located remote from the slot, see Figs. 2 to 5 inclusive. The arcuate opening 24 is in open communication with the interior of the hopper 12 at all times, while the air passage 25 likewise constantly communicates with the control valve 21 of the main air supply line 20 through a branch pipe 26; and the hopper base 23 has a peripheral annular depending lip 27 which snugly but slidably coacts with the outer annular wall of the housing 16, and is normally held in place by several rods 28 secured to the lower portion of the housing 16 and having thereon manually adjustable nuts 29 coacting with radial lugs 30 formed integral with the base 23. In this manner, the hopper 12 is adjustably associated with the fixed housing 16 and is centralized relative thereto, but is positively prevented from rotating.

The elongated horizontal tubular feed rotor casing 14 which is located beneath and is fixedly attached to the measuring rotor housing 16, has a downwardly enlarging and directed unobstructed medial material receiving conduit 31 the upper smaller end of which communicates with an arcuate opening or slot 32 formed in the base of the housing 16, and the lower enlarged end of which is in open communication with the upper portion of the feed rotor 13, see Figs. 2, 4 and 5. The improved feed rotor 13 is provided with an annular series of elongated parallel peripheral grooves or recesses 33 having relatively small transverse cross-section and which are preferably substantially straight or rectilinear, and these recesses 33 span the lower enlarged end of the conduit 31 and are adapted to receive small increment charges of material from the revolving rotor 15 and carry these increments or charges toward the bottom of the feed rotor chamber as the rotor 13 revolves. The feed rotor 13 preferably has a rather loose fit within the medial portion of the tubular casing 14, and is normally constantly revolvable within this casing by means of a horizontal shaft 34 journalled in bearings formed in an insert member 35 at the rear end of the casing 14; and this member 35 is provided with an end wall 36 sealing the rear ends of the upper rotor recesses 33, and with a lower forwardly enlarging compressed air duct 37 communicating with the branch pipe 26 beyond the valve 21 through another branch pipe 38. The air duct 37 is straight and horizontally disposed, and is directed longitudinally of the feed rotor 13 and casing 14 in alinement with the lower feed rotor recesses 33 as clearly indicated in Figs. 2, 4 and 5; and a second insert member or element 39 is confined within the forward end of the casing 14 and is provided with an end wall 40 sealing the front ends of the upper rotor recesses 33, and with a lower forwardly extending unobstructed material delivery duct 41 the front end of which is in open communication with a flexible conduit 42 leading to the zone of utilization of the mixed and agitated material. The outlet end of the delivery hose or conduit 42 is preferably provided with a spray nozzle or gun such as shown in my prior patent, for mixing liquid such as water with the aggregate material treated and transported by the improved system.

The improved material measuring and air lock rotor 15 which is confined within the housing 16 intermediate the supply hopper 12 and the feed rotor 13 and casing 14, is provided with an annular series of upright open ended cylindrical measuring pockets 43; and is normally constantly revolvable about an upright axis by means of a driving shaft 44 journalled for rotation in the central hub 45 of the fixed rotor housing 16, and which is drivingly connected to the rotor 15 by a spline 46 so as to permit slight downward movement of the main rotor and of the elements resting thereon, see Figs. 2, 3 and 5. The upper end of the rotor 15 is provided with a flat annular surface 47 of limited area adjoining the upper inlet ends of the pockets 43, and the lower end of this rotor is likewise provided with a similar flat annular surface 48 adjoining the lower outlet end of the measuring pockets, and the portions of the rotor 15 directly adjacent to the interiors and exteriors of these surfaces 47, 48 are cut away at oblique angles as clearly illustrated in Figs. 2 and 3. An upper annular rubber sealing disk or member 49 is fixedly confined between the lower face of the hopper base 23 and the rotor surface 47, being provided with an elongated arcuate slot which registers with the hopper discharge opening 24, and with a port 50 communicating with the compressed air supply passage 25 of the base 23. A lower annular rubber sealing disk or member 51 is likewise stationarily confined between the upper face of the base portion of the housing 16 and the rotor surface 48, being provided with an arcuate elongated opening 52 which registers with the discharge slot 32 of the housing 16 and is disposed in vertical alinement with the port 50. The measuring rotor 15 is normally revolvable between these rubber sealing members 49, 51, and the pockets 43 thereof are so spaced that several pockets of the series having their lower ends tightly closed by the lower sealing member 51 may be simultaneously in communication at their upper ends with the material supply hopper 12 through the opening 24, but both ends of the successive pockets 43 are sealed from communication with the hopper 12 by the members 49, 51 when the individual pockets are in alinement with the port 50 and slot 32 as in Figs. 2 to 5 inclusive, thus providing an efficient air lock.

The upper end of the upright drive shaft 44 for the measuring rotor 15, may be provided with a protecting cap 53, see Fig. 5, and this shaft 44 is adapted to be slowly rotated by a worm wheel 54 disposed within a gear casing 55 secured to the housing hub 45, see Fig. 2; and the horizontal drive shaft 34 for the feed rotor 13 is adapted to be simultaneously driven at any desired speed by a chain drive 56 or the like, see Fig. 1. Both of the shafts 44, 34 are operable by the engine 17 by merely manipulating the clutch mechanism 18 in a well known manner, and the supply of compressed air delivered to the branch pipes 26, 38 from the supply line 20 is also controllable by the valve 21. The supply line 20 may be connected to the pipes 26, 38 by means of a clamp 57, and the hose conduit 42 may be detachably connected to the insert element 39 with the aid of a coupling 58; and suitable provision should also be made for maintaining the various bearings well lubricated and protected against entry of foreign matter, at all times.

During normal operation of the improved measuring, mixing and feeding device, the portable unit after having been properly constructed, assembled and lubricated, may be readily transported from place to place and actuated to accurately measure, thoroughly mix, and to deliver a constant stream of uniformly treated aggregate material through the discharge conduit 42 to the final zone of utilization, such as a spray gun or the like. Such actuation may be effected at will by merely operating the engine 17, throwing in the clutch mechanism 18, opening the compressed air supply valve 21, and maintaining an abundant supply of material such as cement, sand, and other desirable ingredients within the hopper 12. When the mixing rotor 15 is being constantly rotated by the shaft 44 and gearing 54, the successive upright pockets 43 are brought into open communication with the supply hopper 12 through the arcuate opening 24 and filled by gravity with equal batches of the material. Due to the extreme length of the hopper discharge opening 24, complete filling of the pockets 43 is assured, and as the successive pockets 43 are carried beyond the opening 24 they are momentarily tightly sealed at both ends by the rubber members 49, 51, before being exposed to the aligned compressed air admission port 50 and the discharge slots 32, 52 and conduit 31.

As soon as each previously filled pocket 43 is brought into alinement with the port 50 and slots 32, 52, the measured batch of material is ejected downwardly therefrom by the compressed air injected through the port 50 from the passage 25; and after passing through the conduit 31, increments of each measured batch of material are removed from the descending charges and only partially fill the relatively small and rapidly revolving upper recesses 33 of the feed rotor 13. The successive emptied pockets 43 are subsequently transported between the sealing members 49, 51 toward the hopper opening 24 for refilling; and while the material laden recesses 33 are being carried toward the lower portion of the casing 14, the compressed air delivered from the conduit 31 flows around the periphery of the loose fitting rotor 13 toward the casing bottom. When the successive material laden recesses 33 have been carried downwardly into axial alinement with the compressed air supply duct 37, the increments of loose material are quickly ejected longitudinally therefrom and into the aligned delivery duct 41 to which the compressed air derived from the pockets 43 also escapes; and the mixture of compressed air and material thereafter flows through the conduit 42 to the zone of utilization in the form of a constant and uniform stream the ingredients of which are thoroughly mixed.

This normal operation of the mechanism may obviously be carried on continuously or intermittently as desired, and since the volumes of the recesses 33 are relatively small as compared to the volumes of the pockets 43, uniform delivery of material at a constant rate is assured, and the apparatus may be shut-down and re-started at any time without danger of producing undesirable slugs or clogging the passages. The improved mechanism obviously embodies only unobstructed rectilinear passages for the material during its transportation from the hopper 12 to the delivery conduit 42, and while the rotor 13 has a loose fit in the casing 14 and is exposed to air pressure at both ends in order to substantially balance the same, the sealing members 49, 51 should always be pressed tightly against the rotor surfaces 47, 48 by periodically manipulating the nuts 29 in order to compensate for wear. However, whenever such wearing of the rubber members 49, 51 occurs, the annular surfaces 47, 48 of the measuring rotor 15 will become embedded within the relatively soft fixed members 49, 51 as shown in Fig. 3, thereby maintaining most effective seals for the pockets 43 until the members 49, 51 are completely worn out and must be renewed.

From the foregoing detailed description of the construction and operation of the present improvement, it will be apparent that my present invention provides an improved measuring, mixing and feeding device which is extremely simple, compact and durable in construction, which is also readily manipulable, and which is moreover extremely flexible and highly efficient in operation. By utilizing two inlets for compressed air, one for the purpose of ejecting the pre-measured batches from the measuring pockets 43 and the other for ejecting the increments of these batches from the recesses 33 of the feed rotor, uniform measuring and delivery of a constant stream of mixture is absolutely assured, and undesirable slugging and clogging are positively eliminated. The formation of the various parts with rectilinear and unobstructed passages for the material, also prevents local accumulation of large quantities of material throughout the lengths of the conveying passages, thereby preventing possible clogging. The improved construction of the measuring rotor 15 furthermore insures maintenance of a thorough seal for the measuring pockets 43 for a considerable period of time as the sealing members 49, 51 become worn, and the material supply hopper 12 which rests upon the rotor may be readily adjusted so as to insure proper sealing of the revolving pockets 43. The relative sizes of the port 50, ducts 37, 41, opening 24, and slot 32 must be accurately proportioned in order to insure most efficient operation, and the improved system of measuring and feeding has proven highly satisfactory and economical in actual use, especially for the purpose of mixing and feeding concrete aggregate for building purposes. The equipment is especially adapted for use in conjunction with so-called cement guns, and has enormous capacity considering the size and power consumption of the unit.

It is also desirable in the construction of units of this type, to provide for increase in the volume of the mixture as it proceeds from the hopper 12 to the discharge conduit 42, and it is for this reason that the various conduits and passages have been slightly tapered and enlarged in the direction of this flow, and the recesses 33 may also be slightly tapered and enlarged proceeding toward their outlet ends in order to prevent packing of material therein. It is also noteworthy that all parts of the improved measuring and feeding assemblage are quickly and conveniently accessible, the hopper 12 and measuring rotor 15 being readily removable by merely releasing the adjusting nuts 29, and the feed rotor 13 being likewise readily removable upon withdrawal of the front insert element 39 from within the casing 14. The rotor 15 of my present improved assemblage, is primarily a measuring device and is most effectively sealed at all times so as to provide an air lock for preventing undesirable escape of compressed air; while the feed rotor 13 is not a measuring device in any sense of the term, but merely functions to agitate, distribute, and to constantly transfer small increments of the measured batches in rapid succession from the measuring rotor to the discharge conduit.

It should be understood that it is not desired to limit this invention to the exact details of construction or to the precise mode of use, herein shown and described, for various modifications within the scope of the appended claims may occur to persons skilled in the art.

I claim:

1. A measuring and feeding device comprising, a material supply hopper having a discharge opening, a measuring rotor having an annular series of pockets successively communicable with said opening to receive batches of material from the hopper, means for injecting fluid under pressure into said pockets to eject said batches therefrom after the pockets have been sealed from said opening, a feed rotor having parallel peripheral recesses of relatively small cross-sectional area for receiving successive increments of the batches ejected from said pockets by said fluid, and means for injecting other fluid under pressure longitudinally through the material laden recesses after they have been substantially sealed from said pockets.

2. A measuring and feeding device comprising, a material supply hopper having a lower discharge opening, a measuring rotor having an annular series of pockets revolvable about an upright axis and successively communicable with said opening to receive batches of material from the hopper, a feed rotor having an annular series of parallel peripheral rectilinear recesses revolvable about a horizontal axis beneath said measuring rotor and which are successively communicable with said pockets to receive increments of the material delivered from the pockets, and means for simultaneously injecting compressed air into the successive pockets after they have been sealed from communication with said hopper opening and into the ends of the successive recesses after they have been substantially sealed from said pockets.

3. A measuring and feeding device comprising, a material supply hopper, a measuring rotor having a series of pockets successively communicable with said hopper, a feed rotor having a series of peripheral rectilinear recesses successively communicable with the successive pockets, and means for simultaneously injecting compressed air into the successive pockets after they have been laden with material and sealed from said hopper and through said successive recesses after they have been laden with material and moved out of communication with said pockets.

4. A measuring and feeding device comprising, a material supply hopper, a measuring rotor having a series of pockets successively communicable with said hopper, a feed rotor having a series of peripheral rectilinear recesses successively communicable with the successive pockets, means for simultaneously injecting compressed air into the successive pockets after they have been laden with material and sealed from said hopper and through said successive recesses after they have been laden with material and moved out of communication with said pockets, and means for simultaneously revolving said measuring and feed rotors about independent axes disposed transversely of each other.

5. A measuring and feeding device comprising, a measuring rotor having an annular series of pockets revolvable about an axis, a material supply hopper at one end of said rotor for delivering batches of material to the adjacent ends of said pockets, a feed rotor having an annular series of rectilinear peripheral recesses revolvable about a transverse axis beyond the other end of said measuring rotor for receiving increments of said batches discharged from the adjacent other ends of said pockets, and annular resilient sealing members interposed between the opposite ends of said measuring rotor and the adjacent structures.

6. A measuring and feeding device comprising, a material measuring rotor having a series of pockets revolvable about an axis, a feed rotor having a series of recesses for receiving increments of batches of material delivered from said measuring pockets, means for injecting compressed air into said pockets to deliver material therefrom toward said feed rotor recesses, and means for injecting other compressed air longitudinally through said recesses to eject material therefrom.

7. A measuring and feeding device comprising, a material measuring rotor having a series of pockets revolvable about an upright axis, means for delivering batches of material by gravity into said pockets, a feed rotor revolvable about a horizontal axis beneath said measuring rotor and having a series of recesses for receiving increments of batches of material discharged from said measuring pockets, and means for injecting independent streams of compressed air into said pockets and longitudinally through said recesses.

8. A measuring and feeding device comprising, a material measuring rotor having a series of pockets revolvable about an upright axis, means for delivering batches of material by gravity into said pockets, a feed rotor revolvable about a horizontal axis beneath said measuring rotor and having a series of recesses for receiving increments of batches of material discharged from said measuring pockets, means for injecting independent streams of compressed air into said pockets and longitudinally through said recesses, and means for simultaneously revolving said measuring rotor at relatively slow speed and said feed rotor at higher speed.

9. A measuring and feeding device comprising, a measuring rotor revolvable about an upright axis and having an annular series of pockets extending therethrough and terminating in parallel flat annular surfaces adjoining the pocket ends, annular rubber sealing members each having a flat surface coacting with and extending inwardly and outwardly beyond the bounding edges of the adjacent rotor surface, the annular inner and outer bounding edges of said rotor surfaces being inclined toward the rotor and away from the intervening pockets and terminating within the adjoining sealing member surfaces, a support coacting with the lower of said sealing members, and a material supply hopper resting upon the upper of said sealing members to press said members against the adjacent rotor surfaces.

10. A measuring and feeding device comprising, a measuring rotor revolvable about an axis and having an annular series of batch measuring pockets, a feed rotor revolvable about a transverse axis at an end of said measuring rotor, said measuring pockets being successively movable into axial alinement and communication with said feed rotor and the latter having peripheral recesses extending parallel to its axis of rotation and movable across the axes of the advancing pockets, and means for delivering compressed air through the material laden recesses after they have been moved out of communication with said pockets.

11. A measuring and feeding device comprising, a measuring rotor revolvable about an upright axis and having an annular series of batch measuring pockets, a feed rotor revolvable about a horizontal axis beneath said measuring rotor, said measuring pockets being successively movable into vertical alinement and open communication with said feed rotor and the latter having an annular series of rectilinear recesses movable across the axes of the advancing pockets, and means for delivering compressed air through the material laden recesses after they have been moved out of communication with said pockets.

12. A measuring and feeding device comprising, a measuring rotor having an annular series of measuring pockets revolvable about an upright axis, a material supply hopper having an elongated arcuate lower discharge opening on one side of said axis for delivering batches of material by gravity into the successive pockets, a housing for said measuring rotor having a shorter arcuate lower discharge slot on the opposite side of said axis for delivering said batches from said pockets after they have been sealed from said hopper discharge opening, a feed rotor having an annular series of longitudinally extending peripheral recesses revolvable beneath said housing slot about a horizontal axis, and means for injecting compressed air longitudinally through said feed rotor recesses after they have been filled with material and moved out of direct communication with said pockets.

13. A measuring and feeding device comprising, a measuring rotor having an annular series of measuring pockets revolvable about an upright axis, a material supply hopper having an elongated arcuate lower discharge opening on one side of said axis for delivering batches of material by gravity into the successive pockets, a housing for said measuring rotor having a shorter arcuate lower discharge slot on the opposite side of said axis for delivering said batches from said pockets after they have been sealed from said hopper discharge opening, a feed rotor having an annular series of longitudinally extending peripheral recesses revolvable beneath said housing slot about a horizontal axis, means for injecting compressed air downwardly through said pockets while in communication with said slot, and means for injecting compressed air longitudinally through said feed rotor recesses after they have been filled with material and moved out of direct communication with said pockets.

14. A measuring and feeding device comprising, a measuring rotor having an annular series of measuring pockets revolvable about an upright axis, a material supply hopper having an elongated arcuate lower discharge opening on one side of said axis for delivering batches of material by gravity into the successive pockets, a housing for said measuring rotor having a shorter arcuate lower discharge slot on the opposite side of said axis for delivering said batches from said pockets after they have been sealed from said hopper discharge opening, a feed rotor having an annular series of longitudinally extending peripheral recesses revolvable beneath said housing slot about a horizontal axis, means for injecting compressed air longitudinally through said feed rotor recesses after they have been filled with material and moved out of direct communication with said pockets, and means for simultaneously slowly revolving said measuring rotor and more rapidly revolving said feed rotor.

15. A measuring and feeding device comprising, a measuring rotor having an annular series of measuring pockets revolvable about an upright axis, a material supply hopper having an elongated arcuate lower discharge opening on one side of said axis for delivering batches of material by gravity into the successive pockets, a housing for said measuring rotor having a shorter arcuate lower discharge slot on the opposite side of said axis for delivering said batches from said pockets after they have been sealed from said hopper discharge opening, a feed rotor having an annular series of longitudinally extending peripheral recesses revolvable beneath said housing slot about a horizontal axis, means for injecting compressed air downwardly through said pockets while in communication with said slot, means for injecting compressed air longitudinally through said feed rotor recesses after they have been filled with material and moved out of direct communication with said pockets, and common means for simultaneously controlling the flow of compressed air to said pockets and said recesses.

16. A measuring and feeding device comprising, a measuring rotor having an annular series of measuring pockets revolvable about an upright axis, a material supply hopper having an elongated arcuate lower discharge opening on one side of said axis for delivering batches of material by gravity into the successive pockets, a housing for said measuring rotor having a shorter arcuate lower discharge slot on the opposite side of said axis for delivering said batches from said pockets after they have been sealed from said hopper discharge opening, a feed rotor having an annular series of longitudinally extending peripheral recesses revolvable beneath said housing slot about a horizontal axis, means for injecting compressed air downwardly through said pockets while in communication with said slot, and means for injecting compressed air longitudinally through said feed rotor recesses after they have been filled with material and moved out of direct communication with said pockets, said measuring rotor supporting said hopper and being sealed adjacent to the opposite ends of said pockets and said feed rotor being loosely confined within its casing.

RICHARD R. COLBURN.